(12) United States Patent
Delrot et al.

(10) Patent No.: US 12,728,601 B2
(45) Date of Patent: Sep. 8, 2026

(54) METHOD FOR DIGITAL ANALYTIC CORRECTION OF PHOTORESPONSIVE MATERIAL REACTIVITY IN ADDITIVE MANUFACTURING

(71) Applicant: Readily3D SA, Lausanne (CH)

(72) Inventors: Paul Delrot, Morges (CH); Damien Loterie, Ecublens (CH)

(73) Assignee: Readily3D SA, Lausanne (CH)

( * ) Notice: Subject to any disclaimer, the term of this patent is extended or adjusted under 35 U.S.C. 154(b) by 115 days.

(21) Appl. No.: 18/688,538

(22) PCT Filed: Aug. 30, 2022

(86) PCT No.: PCT/EP2022/073992
§ 371 (c)(1),
(2) Date: Mar. 1, 2024

(87) PCT Pub. No.: WO2023/031140
PCT Pub. Date: Mar. 9, 2023

(65) Prior Publication Data
US 2024/0367385 A1 Nov. 7, 2024

(51) Int. Cl.
*B29C 64/393* (2017.01)
*B22F 10/28* (2021.01)
(Continued)

(52) U.S. Cl.
CPC ............ *B29C 64/393* (2017.08); *B22F 10/28* (2021.01); *B22F 10/36* (2021.01); *B22F 10/85* (2021.01);
(Continued)

(58) Field of Classification Search
CPC ......... B33Y 10/00; B33Y 30/00; B33Y 50/02; B29C 64/124; B29C 64/129;
(Continued)

(56) References Cited

U.S. PATENT DOCUMENTS 5,344,298 A 9/1994 Hull
6,500,378 B1 12/2002 Smith
(Continued)

FOREIGN PATENT DOCUMENTS

DE 10 2019 129 868 A1 5/2021
EP 3 333 629 A1 6/2018
(Continued)

OTHER PUBLICATIONS

M. Shusteff et al., "One-step volumetric additive manufacturing of complex polymer structures", Science Advances, Material Science, vol. 3, Issue 12, Dec. 8, 2017, See Spc., p. 2 See International Search.
(Continued)

*Primary Examiner* — Jamel M Nelson
(74) *Attorney, Agent, or Firm* — Secant IP, P.L.L.C.

(57) ABSTRACT

The invention discloses a method and system to digitally compensate for reactivity inhomogeneities of a photoresponsive material within a build volume of an additive manufacturing system, which offers significant advantages for the production of high-fidelity and high-accuracy three-dimensional objects. The method comprises a) Providing a digital model of said three-dimensional object, b) defining a sequence of patterns of light (31) from said digital model, and c) irradiating with each of said patterns of light (31) according to the defined sequence a photoresponsive material (32) that is capable of alteration of its material phase upon irradiation by light, thereby creating a three-dimensional distribution of alterations within the photoresponsive material (32) which physically reproduces said three-dimensional object, thereby creating the three-dimensional object. The step of defining said sequence of patterns of light (31) involves a compensation of an expected light intensity of said patterns of light (31) for any deviations of an alteration
(Continued)

rate in said photoresponsive material caused by auto-acceleration or auto-deceleration, so as to obtain a constant alteration rate throughout said photoresponsive material (32), wherein said compensation is computed from a predicted three-dimensional light dose distribution in the photoresponsive material (32) and a function describing an alteration response of the photoresponsive material (32) to light dose.

18 Claims, 4 Drawing Sheets

(51) Int. Cl.

| | |
|---|---|
| ***B22F 10/36*** | (2021.01) |
| ***B22F 10/85*** | (2021.01) |
| ***B28B 1/00*** | (2006.01) |
| ***B28B 17/00*** | (2006.01) |
| ***B29C 64/124*** | (2017.01) |
| ***B29C 64/153*** | (2017.01) |
| ***B29C 64/255*** | (2017.01) |
| ***B33Y 10/00*** | (2015.01) |
| ***B33Y 30/00*** | (2015.01) |
| ***B33Y 50/02*** | (2015.01) |
| *B29K 105/00* | (2006.01) |
| *B29K 105/16* | (2006.01) |

(52) U.S. Cl.

CPC .......... *B28B 1/001* (2013.01); *B28B 17/0081* (2013.01); *B29C 64/124* (2017.08); *B29C 64/153* (2017.08); *B29C 64/255* (2017.08); *B33Y 10/00* (2014.12); *B33Y 30/00* (2014.12); *B33Y 50/02* (2014.12); *B29K 2105/0032* (2013.01); *B29K 2105/16* (2013.01)

(58) Field of Classification Search

CPC ... B29C 64/135; B29C 64/153; B29C 64/393; B28B 1/001; B22F 10/85; B22F 10/36; B22F 10/362; B22F 10/364; B22F 10/366; B22F 10/368; B22F 10/28; B22F 10/12

See application file for complete search history.

(56) References Cited

U.S. PATENT DOCUMENTS

| | | | |
|---|---|---|---|
| 10,525,630 B2 | 1/2020 | Nguyen et al. | |
| 2016/0221262 A1* | 8/2016 | Das | B22C 9/24 |
| 2017/0151718 A1 | 6/2017 | Rolland et al. | |
| 2018/0326666 A1* | 11/2018 | Kelly | B29C 64/241 |
| 2019/0160733 A1 | 5/2019 | Mirkin et al. | |
| 2022/0410473 A1 | 12/2022 | Garmshausen et al. | |

FOREIGN PATENT DOCUMENTS

| | | |
|---|---|---|
| EP | 3 691 860 B1 | 7/2023 |
| WO | 2017/210298 A1 | 12/2017 |
| WO | 2019/043529 A1 | 3/2019 |
| WO | 2020/245456 A1 | 12/2020 |
| WO | 2020/254068 A1 | 12/2020 |
| WO | 2021/058437 A1 | 4/2021 |

OTHER PUBLICATIONS

B. E. Kelly et al., "Volumetric additive manufacturing via tomographic reconstructions", Science, vol. 363, Issue 6431, Mar. 8, 2019, See Spc., p. 2.

D. Loterie et al., "Volumetric 3D Printing of Elastomers by Tomographic Back-Projection", A Preprint, Nov. 8, 2018, See Spc., p. 2.

M. Regehly et al., "Xolography for linear volumetric 3D printing", Nature, 588, pp. 620-624, Dec. 23, 2020, See Spc., pp. 3 & 30.

Xu et al. "A Reverse Compensation Framework for Shape Deformation Control in Additive Manufacturing", Journal of Computing and Information Science in Engineering, vol. 17, Issue 2, Feb. 16, 2017, See Spc., p. 5.

M. Cosma et al., "Photopolymerized additive manufacturing materials: Modeling of the printing process, mechanical behavior, and sensitivity analysis", Material Design & Processing Communications, vol. 3, Issue 6, Dec. 2021, See Spc., p. 5.

A. Wolfer et al., "Fast solution strategy for transient heat conduction for arbitrary scan paths in additive manufacturing", Additive Manufacturing, vol. 30, Dec. 2019, See Spc., p. 6.

D. Watts, "Reaction kinetics and mechanics in photo-polymerised networks", Dental Materials, vol. 21, No. 1, Jan. 1, 2005, See International Search.

J. Madrid-Wolff et al., "Light-based Volumetric Additive Manufacturing in Scattering Resins", ARXIV.org, Cornell University Library, May 31, 2021, See International Search.

International Search Report Corresponding to PCT/EP2022/073992 mailed Nov. 17, 2022.

Written Opinion Corresponding to PCT/EP2022/073992 mailed Nov. 17, 2022.

* cited by examiner

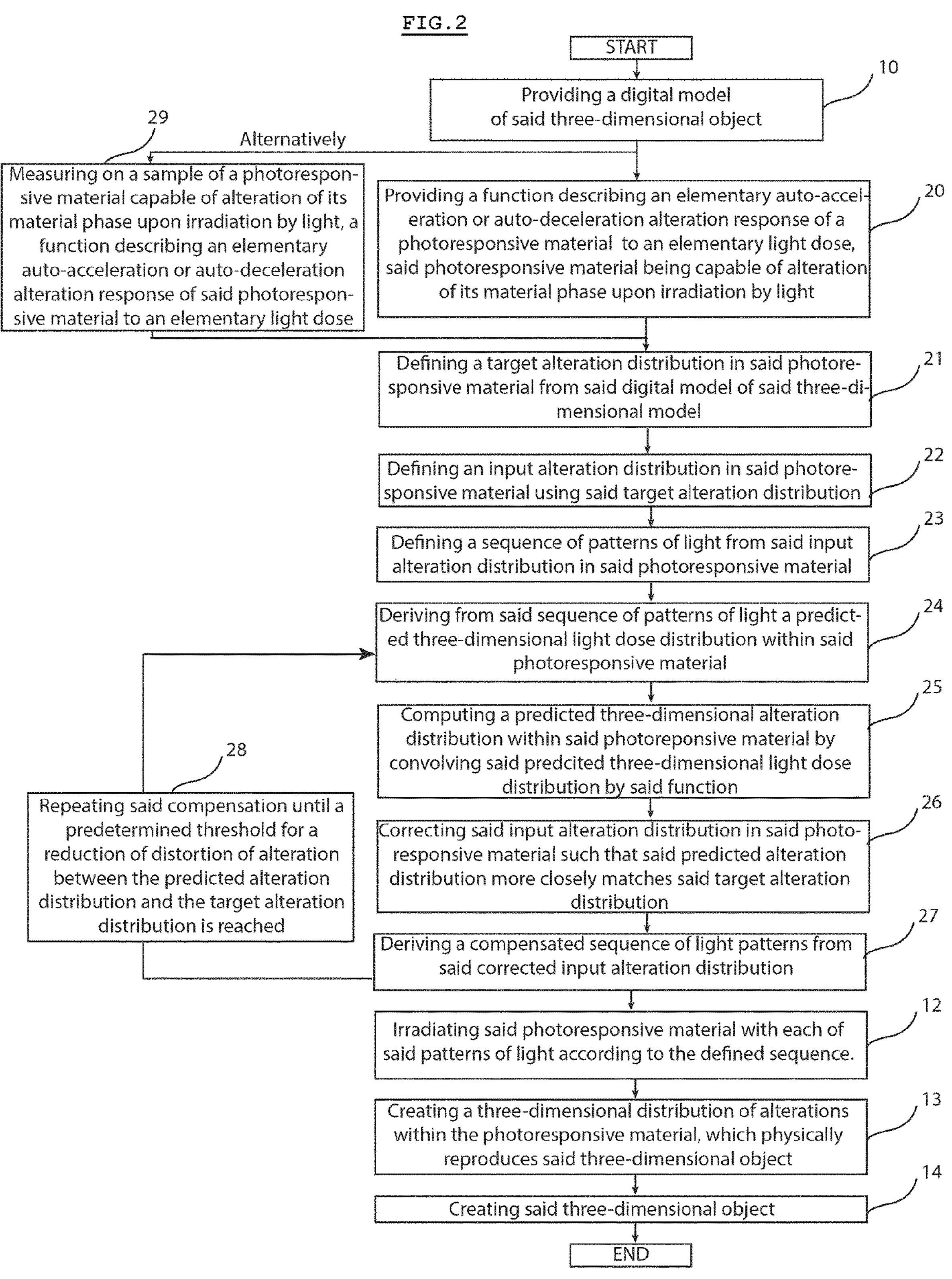
FIG.2
START
Providing a digital model of said three-dimensional object
10
29
Alternatively
Measuring on a sample of a photoresponsive material capable of alteration of its material phase upon irradiation by light, a function describing an elementary auto-acceleration or auto-deceleration alteration response of said photoresponsive material to an elementary light dose
Providing a function describing an elementary auto-acceleration or auto-deceleration alteration response of a photoresponsive material to an elementary light dose, said photoresponsive material being capable of alteration of its material phase upon irradiation by light
20
Defining a target alteration distribution in said photoresponsive material from said digital model of said three-dimensional model
21
Defining an input alteration distribution in said photoresponsive material using said target alteration distribution
22
Defining a sequence of patterns of light from said input alteration distribution in said photoresponsive material
23
Deriving from said sequence of patterns of light a predicted three-dimensional light dose distribution within said photoresponsive material
24
Computing a predicted three-dimensional alteration distribution within said photoreponsive material by convolving said predcited three-dimensional light dose distribution by said function
25
28
Repeating said compensation until a predetermined threshold for a reduction of distortion of alteration between the predicted alteration distribution and the target alteration distribution is reached
Correcting said input alteration distribution in said photoresponsive material such that said predicted alteration distribution more closely matches said target alteration distribution
26
Deriving a compensated sequence of light patterns from said corrected input alteration distribution
27
Irradiating said photoresponsive material with each of said patterns of light according to the defined sequence.
12
Creating a three-dimensional distribution of alterations within the photoresponsive material, which physically reproduces said three-dimensional object
13
Creating said three-dimensional object
14
END

METHOD FOR DIGITAL ANALYTIC CORRECTION OF PHOTORESPONSIVE MATERIAL REACTIVITY IN ADDITIVE MANUFACTURING

BACKGROUND OF THE INVENTION

1. Field of the Invention

The present invention relates to a method for digitally and analytically compensating the inhomogeneous reactivity of a photoresponsive material within a build volume of an additive manufacturing system. In detail, the method of the present invention provides an open-loop correction of photoresponsive material reactivity inhomogeneities, such as local polymerization auto-acceleration arising from local heat or viscosity increase. Such photoresponsive material reactivity inhomogeneities often result in a loss of geometric fidelity of the additively manufactured object with respect to the designed digital model. Consequently, the method of the present invention also significantly improves the printing resolution and accuracy of additive manufacturing systems, which is a significant improvement over the prior art.

2. Background Art

In conventional additive manufacturing, a three-dimensional object is fabricated either by point-wise scanning of the object volume or in a layer-by-layer fashion. An example is stereo-lithography (SLA) (see for example U.S. Pat. No. 5,344,298), where the object is formed one layer at a time by the solidification of a photo-curable resist under light irradiation before application of a subsequent layer. The successive layers of the object can be defined for example by scanning a laser beam point-by-point, as suggested in U.S. Pat. No. 534,429, or by digital light processing (DLP) technology, as described in U.S. Pat. No. 6,500,378.

To overcome the geometric constraints and throughput limitations of layer-by-layer light-based AM techniques, namely digital-light processing (DLP) and stereo-lithography (SLA), multi-beam AM techniques have been proposed (Shusteff, M. et al., One-step volumetric additive manufacturing of complex polymer structures, Sci Adv 3, eaao5496-(2017); Kelly, B. E. et al., Volumetric additive manufacturing via tomographic reconstruction, Science 363, 1075-1079 (2019); Loterie, D., Delrot, P. & Moser, C., VOLUMETRIC 3D PRINTING OF ELASTOMERS BY TOMOGRAPHIC BACK-PROJECTION (2018), preprint DOI: 10.13140/RG.2.2.20027.46889). These techniques are subsequently referred to as volumetric tomographic printing or tomography-based additive manufacturing (tomographic additive manufacturing).

The working principle of volumetric tomographic printing (WO 2019/043529 A1) is entirely different than the traditional layer-by-layer approach (i.e. 3D printing with the formation of one layer over the other) in conventional additive manufacturing (AM). In tomography-based additive manufacturing methods, the object is not formed by sequentially curing layers of a photopolymer, but rather a volume of transparent photoresponsive material is irradiated from multiple angles with computed patterns of light, which results in the local accumulation of light dose and the consequent simultaneous solidification of specific object voxels, in order to fabricate a three-dimensional object in a single step. The main advantages of this method compared to existing methods are its very rapid manufacturing time (down to a few tens of seconds), and its ability to print complex hollow structures without the need for support structures as required in layer-by-layer manufacturing systems.

A specific variant is a dual-color technique, such as xolography. In dual-color volumetric additive manufacturing, photo-switchable photoinitiators are used to induce local polymerization inside a confined monomer volume upon linear excitation by intersecting light beams of different wavelengths (see e.g. Regehly et al., Nature, Vol. 588 (2020), 620-624). Accordingly, in this embodiment use is made of a photoresponsive material that changes its material phase only upon the concurrent irradiation by two different wavelengths of light and does not change its material phase when irradiated by light of only one of the first or second wavelength.

Photoresponsive materials used in additive manufacturing systems can exhibit reactivity inhomogeneities over the build volume, which degrade the printing fidelity and accuracy. The printed objects are consequently not true to their digital model, hence losing part of their functionalities.

Reactivity inhomogeneities can stem, for example, from polymerization-induced heat generation or from polymerization-induced viscosity increase.

Since polymerization is a highly exothermal reaction, selectively curing a photoresponsive material to form an object will give rise to local temperature increase which in turn will locally accelerate the polymerization reaction rate. Consequently the bulk parts of a 3D printed object, where more polymerization-induced heat is released, tend to polymerize faster than the porous parts, which degrades both the printing accuracy and resolution.

A similar auto-acceleration phenomenon, also called gel effect or Trommsdorff-Norrish effect, can appear because of polymerization-induced viscosity increase in the photoresponsive material. Briefly, this means that the polymerization rate of a monomer into a long polymer chain can be approximated to be a competition between the accelerating propagation of the chain reaction by reaction of reactive radical centers and the decelerating termination of the chain reaction by dual recombination of radicals. Bulk parts of an object that is being polymerized are made of increasingly longer polymer chains that can no longer easily recombine with reactive radical centers, thus decreasing the probability for dual recombination. As the average length of polymer chains increases during polymerization, viscosity also increases which in turn reduces the termination rate. The polymerization propagation is then no longer moderated and self-accelerates locally, thus degrading the printing performances (accuracy, precision and resolution).

Prior art focused on two approaches to correct photoresponsive material reactivity inhomogeneities in additive manufacturing: hardware and digital correction.

In layer-by-layer additive manufacturing, a system was described in WO 2017/210298 A1 to correct potential reactivity inhomogeneities arising from polymerization-induced heat generation by using a de-wetting coolant flowing along the two-dimensional reactive front of the build volume. Such system requires finding coolants that are immiscible with the printing photoresponsive material, present low toxicity and are unreactive. In addition, this approach is obviously not adapted to volumetric additive manufacturing, wherein the whole object is produced at once within a large volume of photoresponsive material. The polymerization front is thus not confined to an interfacial two-dimensional plane as in layer-wise additive manufacturing, but is rather three-dimensional and embedded in the build volume, which cannot be accessed by any coolants.

Similarly, digital corrections for improving printing accuracy and precision were implemented in additive manufacturing. For instance, a feedback correction approach (Xu et al., A reverse compensation framework for shape deformation control in additive manufacturing, Journal of Computing and Information Science in Engineering, 2017, vol. 17, 0211012-1)) relied on fabricating an object during a first run of an additive manufacturing system, then creating a digital map of errors as compared to the original digital object model and finally correcting the digital object model prior to reprinting it. Obviously, this approach is not industrially applicable, since it would require printing an object at least twice before reaching a satisfactory result.

To avoid printing sacrificial objects for correcting the manufacturing quality, digital open-loop approaches like finite element modeling (FEM) were implemented. These methods (U.S. Pat. No. 10,525,630 B2, M. P. Cosma and R. Brighenti, Photopolymerized additive manufacturing materials: Modeling of the printing process, mechanical behavior, and sensitivity analysis, Mat. Design Process Communications, 2021, e225) rely on multi-physics finite element simulations that encompass all physicochemical phenomena linked to the object fabrication process such as heat generation, heat diffusion, light absorption and scan speed, to detect potential corrections to apply either to the digital object model or to the manufacturing parameters. The computation time required by these digital open-loop approaches clearly makes them not industrially applicable to fast manufacturing method such as additive manufacturing.

Volumetric additive manufacturing systems, such as tomographic additive manufacturing (WO 2019/043529 A1) or dual-color volumetric additive manufacturing (WO 2020/245456 A1), are very sensitive to photoresponsive material reactivity inhomogeneities since cubic centimeters of photoresponsive materials are photopolymerized within a few seconds to fabricate three-dimensional objects. Consequently, high amounts of heat are quickly and locally released by specific locations of the three-dimensional build volume, which results in local polymerization auto-accelerations. Furthermore, with such a short fabrication time, the thermal diffusion length scales with a tenth of the build volume length, which makes heat-induced reactivity corrections difficult to implement. Indeed, if over the fabrication time, the thermal diffusion length was negligible over the build volume length, heat diffusion would be negligible and heat generation could be approximated and corrected to areas where light dose is deposited. On the other hand, if the thermal diffusion length was much longer than the build volume characteristic length, thermal-induced photoresponsive material reactivity inhomogeneities could be neglected as the build volume would reach an isothermal state in a much shorter time than the fabrication time.

Prior art on thermal simulation methods in additive manufacturing includes a semi-analytic method (Wolfer et al., Fast solution strategy for transient heat conduction for arbitrary scan paths in additive manufacturing, Additive Manufacturing 30 (2019) 100898) for computing transient heat conduction in powder bed fusion. This semi-analytic method uses a Green's function approach to compute thermal field history maps resulting from the scan path of a laser in a powder bed. Though this approach is shown to be one order of magnitude faster than finite element simulations, the obtained thermal field history maps were not used to correct inhomogeneities in powder bed fusion processes.

In volumetric additive manufacturing, prior art focused on correcting the three-dimensional light dose deposition by either compensating for the optical distortion induced by refraction in an open-loop scheme (WO 2021/058437 A1) or by compensating printing inhomogeneities through a closed-loop imaging system (WO 2020/254068 A1). Though of interest in volumetric additive manufacturing, closed-loop correction of light dose deposition requires fast computation and thus extensive computational power.

As a consequence, there is a need for a fast, open-loop method to correct photoresponsive material reactivity inhomogeneities in additive manufacturing in an industrially applicable manner.

Additionally, the use of vessels as build volumes in volumetric additive manufacturing offers an opportunity for automatizing manufacturing processes, including the fabrication of biological living constructs. However, the post-processing of the volumetrically printed structures is currently inefficient in that it requires the transfer of the printed part in another post-processing unit or volume. Hence, there is a need for vessel consumables for volumetric additive manufacturing that allows in-situ post-processing and further automatization of the volumetric additive manufacturing processes.

SUMMARY OF THE INVENTION

The present invention circumvents all of the previous shortcomings of methods and systems for digitally compensating the inhomogeneous reactivity of a photoresponsive material within a build volume of an additive manufacturing system.

The invention herein disclosed provides a method and a system to digitally compensate the inhomogeneous reactivity of a photoresponsive material within a build volume of an additive manufacturing system for the production of high-fidelity and high-accuracy three-dimensional objects.

Accordingly, the present invention provides a method for producing a three-dimensional object, the method comprising:

a) providing a digital model of said three-dimensional object, b) defining a sequence of patterns of light from said digital model, and c) irradiating with each of said patterns of light according to the defined sequence a photoresponsive material that is capable of alteration of its material phase upon irradiation by light, thereby creating a three-dimensional distribution of alterations within the photoresponsive material which physically reproduces said three-dimensional object, thereby creating the three-dimensional object, characterized in that the step of defining said sequence of patterns of light involves a compensation of an expected light intensity of said patterns of light for any deviations of an alteration rate in said photoresponsive material caused by auto-acceleration or auto-deceleration, so as to obtain a constant alteration rate throughout said photoresponsive material, wherein said compensation is computed from a predicted three-dimensional light dose distribution in the photoresponsive material and a function describing an alteration response of the photoresponsive material to light dose.

In a preferred embodiment, said computation of said compensation comprises a convolution or deconvolution of said predicted three-dimensional light dose distribution in the photoresponsive material with a describing function an elementary auto-acceleration or auto-deceleration alteration response of the photoresponsive material to an elementary light dose.

In a preferred embodiment, said function describing an elementary auto-acceleration or auto-deceleration alteration response of the photoresponsive material to an elementary light dose comprises an impulse response function, wherein said impulse response function comprises the influence of an effect selected from the group consisting of:

heat generated within a specific area of said photoresponsive material, said heat influencing the reaction rate within said specific area and possibly the surrounding areas;

viscosity, such as the Trommsdorff-Norrish effect, photobleaching, scattering, or any combination thereof.

Furthermore, in a preferred embodiment, said predicted three-dimensional light dose distribution in the photoresponsive material is obtained by the following steps:

defining a target alteration distribution in said photoresponsive material from said digital model of said three-dimensional object;

defining an input alteration distribution in said photoresponsive material using said target alteration distribution;

defining said sequence of patterns of light from said input alteration distribution in said photoresponsive material; and deriving from said sequence of patterns of light said predicted three-dimensional light dose distribution within said photoresponsive material.

In a preferred embodiment, said convolution of said predicted three-dimensional light dose distribution by said function provides a predicted three-dimensional alteration distribution within said photoresponsive material, which is used for correcting said input alteration distribution in said photoresponsive material such that the predicted alteration distribution more closely matches said target alteration distribution.

In a preferred embodiment, a compensated sequence of patterns of light is derived from said corrected input alteration distribution, which is used in step c) of the method of the present invention for creating the three-dimensional object.

In a preferred embodiment, said compensation is repeated until a predetermined threshold for a reduction of distortion of alteration between the predicted alteration distribution and the target alteration distribution has been reached.

In a preferred embodiment, said convolution is performed analytically, or in the Fourier domain, or algebraically, or point-by-point, or a combination thereof.

In a preferred embodiment, said function describing an elementary auto-acceleration or auto-deceleration alteration response of the photoresponsive material to an elementary light dose comprises one or more scaling coefficients that affect the height, the width, or both the height and the width of said function.

In a further embodiment, said scaling coefficients are measured experimentally on a sample of said photoresponsive material.

In a preferred embodiment of the method of the present invention, said photoresponsive material comprises at least one component selected from a list consisting of:

a prepolymer, a photo-initiator that interacts with said one or more light sources to selectively alter the phase of said photoresponsive material, a chain extender;

a reactive diluent;

a filler;

a polymerization inhibitor;

a pigment or dye;

solid particles, most preferably metallic powder particles, preferably particles selected from the group consisting of plastic particles, polymeric particles, ceramic particles, glass particles, and combination thereof.

In a preferred embodiment, said photoresponsive material comprises a first photo-initiator in an amount such that an optical depth of penetration of at least one of the said one or more light sources is larger than a fifth of a width of said three-dimensional object.

In another embodiment of the method of the present invention, said sequence of patterns of light is provided by computing a sequence of back-projections describing the three-dimensional object to be formed from different orientation angles of said object, or alternatively from different layers of said object.

Moreover the present invention provides a system for producing a three-dimensional object from a photoresponsive material, the system comprising:

a first projection unit capable of emitting controlled spatial patterns of light;

optionally a second projection unit capable of emitting controlled spatial patterns of light;

a means for computing a sequence of projections describing the three-dimensional object to be formed along different orientation angles, different layers, or different combinations of orientation angles and layers of said object; said projections being used to define said controlled patterns of light, wherein said means is configured to provide a compensation of an expected light intensity of said projections for any deviations of an alteration rate in said photoresponsive material caused by auto-acceleration or auto-deceleration, so as to obtain a constant alteration rate throughout said photoresponsive material, wherein said compensation is computed from a predicted three-dimensional light dose distribution in the photoresponsive material and a function describing an alteration response of the photoresponsive material to light dose;

a vessel, which is optionally optically transparent to said patterns of light, said vessel intended to contain a volume of photoresponsive material, and said vessel and the intended photoresponsive material defining a build volume;

wherein the first projection unit is arranged in the system to irradiate said build volume with said controlled patterns of light; and a direction varying means, or a position varying means, or a means able to vary both position and direction, operatively associated with said first projection unit, for controllably varying a direction or position of incidence of said patterns of light relative to said build volume, either by rotating and/or moving the build volume within the field of illumination of the first projection unit, or by rotating and/or moving the first projection unit relative to the build volume, or a combination of both of these rotations and/or motions, and for executing the computed sequence of projections by irradiating the photoresponsive medium with the controlled patterns of light from directions and positions corresponding to the different orientation angles and positions thereby creating a three-dimensional distribution of alterations of the photoresponsive medium, and creating the three-dimensional object.

In a further embodiment of the system of the present invention, said computation of said compensation comprises a convolution or deconvolution of said predicted three-dimensional light dose distribution in the photoresponsive material with a function describing an elementary auto-acceleration or auto-deceleration alteration response of the photoresponsive material to an elementary light dose.

In a preferred embodiment, said system is a volumetric additive manufacturing system, preferably selected from the group consisting of a tomography-based additive manufacturing system and a dual-color-based additive manufacturing system, such as xolography.

In another embodiment of the present invention, the vessel used in either single-color or dual-color volumetric additive manufacturing systems comprises one or more inlets and one or more outlets for automation of volumetric additive manufacturing systems. In a preferred embodiment, said vessel comprises at least an inlet and an outlet and most preferably at least two inlets and two outlets, said inlets and outlets being used for any post-processing steps from the group consisting of:

developing said produced three-dimensional object,
curing said produced three-dimensional object,
perfusing said produced three-dimensional object.

In a preferred embodiment, said spatial patterns of light are two-dimensional.

In another embodiment of the system of the present invention, said spatial patterns of light are one-dimensional.

In a further embodiment, said system is a layer-by-layer additive manufacturing system selected from the group consisting of stereolithography, selective laser sintering, selective laser melting, continuous liquid interface production.

In another embodiment, the present invention provides a method for producing a three-dimensional object, the method comprising:

a) providing a digital model of said three-dimensional object,
b) defining a sequence of patterns of light from said digital model, and
c) irradiating with each of said patterns of light according to the defined sequence a photoresponsive material that is capable of alteration of its material phase upon irradiation by light, thereby creating a three-dimensional distribution of alterations within the photoresponsive material which physically reproduces said three-dimensional object, thereby creating the three-dimensional object, characterized in that the step of defining said sequence of patterns of light involves a compensation of an expected light intensity of said patterns of light for any deviations of said three-dimensional object geometry from said digital model geometry of said three-dimensional object, wherein said compensation is computed using a machine learning process.

Said machine learning process can be, but is not limited to, a regression analysis model that aims at estimating from the produced three-dimensional objects the causes for systematic geometric deviations from the respective digital models of said three-dimensional objects. In more detail, the input, also called independent variables, of said regression analysis model can be a set of measured least squares geometric deviations between a set of produced three-dimensional objects and their respective digital models. The measurement of the geometric dimensions of the produced three-dimensional objects can be performed for example with a 3D scanner. The dependent variables of said regression analysis model can be the set of sequences of light patterns that were used to produce said set of respective three-dimensional objects. The regression analysis model can be programmed to infer the causal relationships between said set of inputs deviations and said respective sequences of light patterns, thus allowing to compute said compensation of expected light intensity of said patterns of light for producing said three-dimensional object in the above embodiment.

BRIEF DESCRIPTION OF THE DRAWINGS

These and other features, aspects and advantages of the present invention will become better understood with regard to the following non-limiting description and drawings where:

FIG. 2: is a flowchart describing an embodiment for digitally compensating the inhomogeneous reactivity of a photoresponsive material within a build volume of an additive manufacturing system.

In the figures, same reference numbers denote the same components.

DETAILED DESCRIPTION

Figure 1:
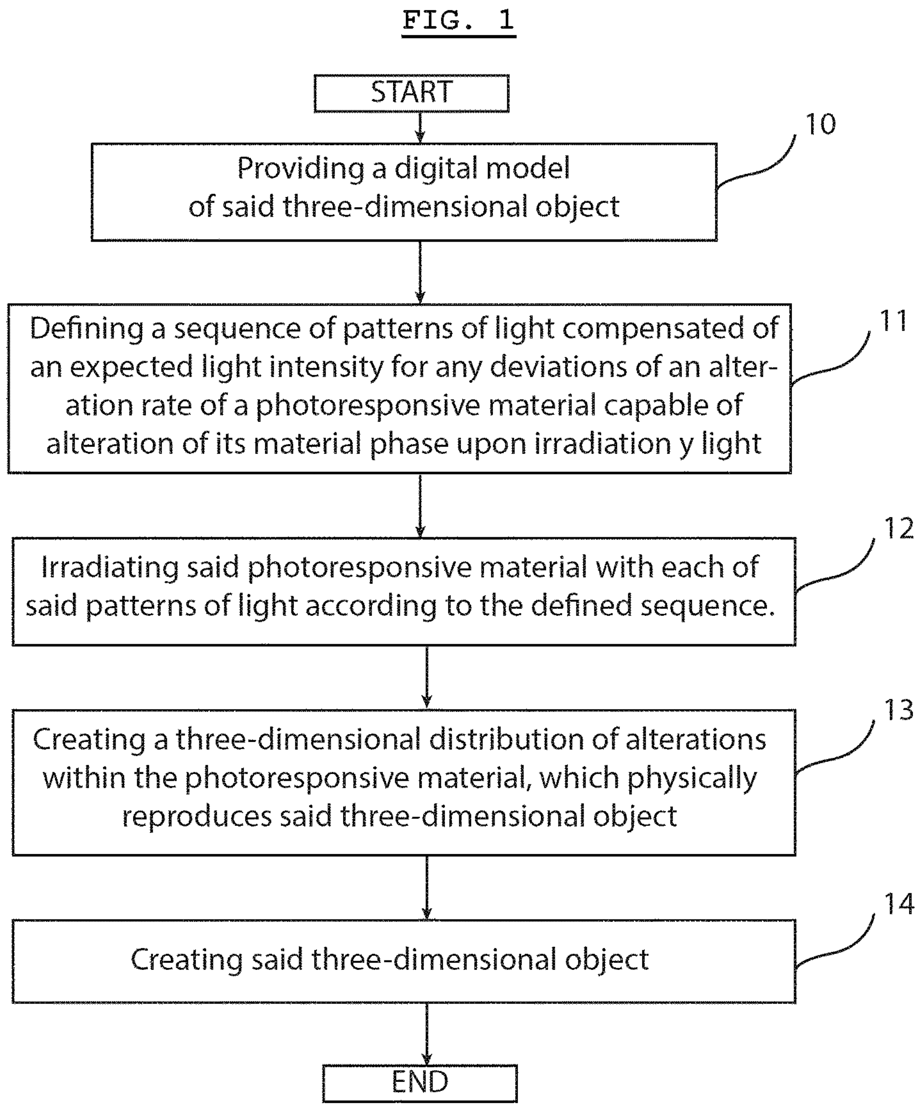
FIG. 1: is a flowchart describing a method of the present invention for producing a three-dimensional object.

According to the present invention, the term "altering its material phase" indicates that a material, preferably a photoresponsive material, may undergo a phase transition, preferably from the liquid to the solid state or to a gel state, or from the gel to the solid state, or from the solid to the liquid state.

According to the present invention, the term "additive manufacturing" refers to methods where a volume of photoresponsive material is irradiated, in order to fabricate a three-dimensional object. Examples of additive manufacturing methods that can be used according to the present invention are dual-color additive manufacturing, such as xolography, tomographic additive manufacturing, stereolithography, selective laser sintering and selective laser melting. These methods are well-known and have been discussed in the background section above. An apparatus for tomographic additive manufacturing is described in detail in e.g. WO 2019/043529 A1 or US 2018/0326666 A1.

The present invention is related to additive manufacturing methods and systems. Preferably, the present invention is related to volumetric additive manufacturing, more preferably selected from the group consisting of a tomography additive manufacturing and dual-color volumetric additive manufacturing.

In a first step of the method of the present invention, a digital model of a three-dimensional object to be produced is provided. This can be realized, for example, with a computer file containing the 3D model in any suitable computer-aided design (CAD) format, such as STL or STEP. Alternatively, a sample of the three-dimensional object to be produced can be scanned, and a digital model be generated therefrom as known in the art.

In a next step of the method of the present invention, a sequence of patterns of light is defined from said digital model. According to a preferred embodiment of the present invention, this can be achieved by computing a sequence of projections describing the three-dimensional object to be formed from different orientation angles of said object or alternatively from different layers of said object, and using said projections for defining said sequence of patterns of light. According to said embodiment, the three-dimensional object to be produced is represented by a series of projections along different angles, similarly to the back-projections in computed tomography. Said back-projections may preferably be computed using a method selected from the group consisting of a Radon-transform followed by a tomographic reconstruction filter; a fan-beam algorithm followed by a tomographic reconstruction filter; a cone-beam algorithm followed by a tomographic reconstruction filter;

an iterative reconstruction technique; an algebraic reconstruction technique; and a diffractive tomography algorithm.

For example, in a first step, the line integral of the density of the digital model of the object is computed along different projection angles. These projections are made along an axis orthogonal to the rotation axis of the build region and for a series of rotation angles of the object to form. In a second step, the obtained series of digital patterns are then filtered to equalize the dose of the volume to cure and to sharpen the object edges, for example with a Ram-Lak filter to compensate for the radial blur of the projections.

After computation, the digital patterns can be generated with a projection unit commonly used in additive manufacturing methods and systems, in a conventional manner.

In a subsequent step, according to the defined sequence a photoresponsive material that is capable of alteration of its material phase upon irradiation by light irradiated with each of said patterns of light. Therewith, a three-dimensional distribution of alterations is created within the photoresponsive medium which physically reproduces said three-dimensional object, thereby creating the three-dimensional object.

According to a preferred embodiment of the present invention, volumetric additive manufacturing is used, which involves irradiating said photoresponsive material with each of said patterns of light at the respective corresponding orientation angle and according to the defined sequence.

According to another preferred embodiment of the present invention, dual-color additive manufacturing is used, which involves irradiating a build volume with intersecting light beams of different wavelengths (see e.g. Regehly et al., Nature, Vol. 588 (2020), 620-624). For dual-color volumetric additive manufacturing, such as xolography, a photoresponsive material is used that changes its material phase only upon the concurrent irradiation by two different wavelengths of light and does not change its material phase when irradiated by light of only one of the first or second wavelength. This is achieved by providing said photoresponsive material with one or more photo-switchable photoinitiators.

The photoresponsive material to be used according to the present invention will be described in more detail below.

As described above, photoresponsive materials used in additive manufacturing systems can exhibit reactivity inhomogeneities over the build volume, which degrade the printing fidelity and accuracy. According to the present invention, it was found that digitally compensating the inhomogeneous reactivity of a photoresponsive material within a build volume of an additive manufacturing system allowed for the production of three-dimensional parts with higher fidelity and higher accuracy. The flexible and versatile method according to the present invention circumvents the computation speed and sacrificial print shortcomings of state-of-the-art methods and systems.

Accordingly, the flowchart of FIG. 1 describes a method of the present invention for producing a three-dimensional object, the method comprising:

a) Providing a digital model of said three-dimensional object (10), b) defining a sequence of patterns of light from said digital model (11), and c) irradiating with each of said patterns of light according to the defined sequence a photoresponsive material that is capable of alteration of its material phase upon irradiation by light (12), thereby creating a three-dimensional distribution of alterations within the photoresponsive material which physically reproduces said three-dimensional object (13), thereby creating the three-dimensional object (14), characterized in that the step of defining said sequence of patterns of light involves a compensation of an expected light intensity of said patterns of light for any deviations of an alteration rate in said photoresponsive material caused by auto-acceleration or auto-deceleration, so as to obtain a constant alteration rate throughout said photoresponsive material, wherein said compensation is computed from a predicted three-dimensional light dose distribution in the photoresponsive material and a function describing an alteration response of the photoresponsive material to light dose.

The method of the present invention provides for a compensation of an expected light intensity of said patterns of light for any deviations of an alteration rate in said photoresponsive material caused by auto-acceleration or auto-deceleration. As discussed above, auto-acceleration or auto-deceleration may occur in the build volume of photoresponsive material by local effects that increase or decrease the alteration rate in certain portions of the build volume. As an example, the Trommsdorff-Norrish effect was discussed above. However, the present invention is not limited to compensations of the Trommsdorff-Norrish effect, but compensates for any auto-acceleration or auto-deceleration caused by any possible effect, such as heat generated in the build volume because of polymerization and being emitted to a specific area of the build volume, increased viscosity caused by the generation of larger polymer moieties, photobleaching, and combinations of these effects.

According to the present invention, said compensation is achieved by predicting a three-dimensional light dose distribution in the photoresponsive material, and computing therefrom, with the aid of a function describing an alteration response of the photoresponsive material to a light dose, the required compensation of said patterns of light.

The predicted three-dimensional light dose distribution in the photoresponsive material can be generally derived from the digital model of the 3D object to be produced, said digital model being provided as described above. The dimensions of said digital model determine the portions of the build volume that are to be altered with respect to their material phase (e.g. have to be solidified). Accordingly, from the digital model a target three-dimensional alteration distribution can be derived which is to be generated in the build volume comprising the photoresponsive material. Said target alteration distribution can be used to define a sequence of patterns of light to be irradiated into the build volume comprising the photoresponsive material. From said sequence of patterns of light, the predicted three-dimensional light dose distribution can be derived. Indeed, it can be computed which three-dimensional light dose distribution should result from the irradiation of said sequence of light patterns into the build volume comprising the photoresponsive material. A resulting three-dimensional alteration distribution of the material phase within the build volume can be derived from the predicted three-dimensional light dose distribution. For example, in prior art on photopolymerization-based additive manufacturing methods, the resulting three-dimensional alteration distribution was theoretically derived by applying a simple high-pass threshold to the predicted three-dimensional light dose distribution.

In this way, the material phase of local portions of the photoresponsive material with light dose above the threshold would be considered to be altered e.g. solidified, whereas the material phase of local portions with light dose below the threshold would be considered not to be altered e.g. unsolidified.

As discussed above, said predicted light does distribution will not be suitable for producing the desired 3D object with very high fidelity and accuracy, since the predicted resulting alteration distribution does not take into account auto-acceleration or auto-deceleration effects in the photoresponsive material.

According to the present invention, auto-acceleration or auto-deceleration effects are compensated for by a compensation method that uses a function describing an elementary auto-acceleration or auto-deceleration alteration response of the photoresponsive material to an elementary light dose.

Auto-acceleration and auto-deceleration alteration response are highly dependent on the type of photoresponsive material used. A non-limiting example of phase alteration of a photoresponsive material upon irradiation by light is photopolymerization. Photopolymerization is a highly exothermal reaction, wherein the reaction-induced heat can locally increase the reaction rate following an Arrhenius-like reaction behavior. Thus, within the build volume the photoresponsive material will locally release some heat, where e.g. fine structures of the object should be formed, thus not significantly accelerating the polymerization reaction; whereas other local portions of the photoresponsive material, e.g. where bulk parts of the object should be formed, will locally release much higher heat thus greatly accelerating the photopolymerization reaction. This will result in bulk areas of the object being solidified faster than the object's fine structures, if formed at all. Overall, auto-acceleration or auto-deceleration phenomena have a detrimental impact on the accuracy and precision in additive manufacturing techniques. Such auto-acceleration or auto-deceleration effects are not predicted, nor compensated for, in prior art, the compensation method and system of the present invention is thus advantageous for higher accuracy and higher precision additive manufacturing.

Similarly, an auto-acceleration phenomenon, the so-called gel effect or Trommsdorff-Norrish effect, can appear because of polymerization-induced viscosity increase in the photoresponsive material. As the average length of polymer chains increases during polymerization, viscosity also increases which in turn reduces the polymerization termination rate. The polymerization propagation is then no longer moderated and self-accelerates locally and can thus degrade the printing performances. Additionally, photobleaching of a photoresponsive material can result in a locally greater absorbed dose within the inner layers of a photoresponsive material than what was initially programmed since the initial layers of photoresponsive material absorb less light than expected. Scattering can on the other hand result in an auto-deceleration alteration response of a photoresponsive material to an elementary light dose because the inner layers of a photoresponsive material will receive less light dose than what was initially expected. Those effects are also detrimental to printing performances such printing accuracy and printing precision.

According to the present invention, auto-acceleration and auto-deceleration effects are taken into account by means of a function describing said effects, and computing from the above predicted three-dimensional light dose distribution with said function the necessary compensation of the sequence of light patterns for these effects.

Said function can be derived theoretically by one skilled in the art, taking into account the essential effects evoked by irradiating a light dose into the photoresponsive material, such as generation of heat. Alternatively, said function can be obtained experimentally, by irradiating a sample of the photoresponsive material with a respective light dose, and measuring the occurring auto-acceleration and auto-deceleration effects.

According to a preferred embodiment of the present invention, elementary auto-acceleration and auto-deceleration alteration responses to an elementary light dose are considered in said function. By elementary, a basic auto-acceleration and auto-deceleration alteration response to a specified input light dose, i.e. a light dose having a specified light intensity and being irradiated into a specific portion of said photoresponsive material, is understood.

In a preferred embodiment of the present invention, said function describing an elementary auto-acceleration auto-deceleration alteration response of the photoresponsive material to an elementary light dose comprises one or more scaling coefficients that affect the height, the width, or both the height and the width of said function. Said scaling factors can either be derived theoretically or experimentally. For example, in the case of heat-induced auto-acceleration of polymerization said scaling factors can be derived from the specific heat capacity of the prepolymer and its thermal diffusion length.

Said function can be used to compute a predicted alteration distribution of the photoresponsive material within the build volume, and thus a necessary compensation of said sequence of light patterns.

Said computation of the compensation can be carried out by any suitable method known in the art such as finite element modelling, algebraic computation, matrices-based computation, optimization, iterative computation, or (de) convolution. According to the present invention it has been found very advantageous to carry out a convolution or de-convolution of said predicted three-dimensional light dose distribution in the photoresponsive material with a describing function an elementary auto-acceleration or auto-deceleration alteration response of the photoresponsive material to an elementary light dose. Convolution (and likewise de-convolution) is a really fast computation method compared to many of the above-mentioned methods such as finite element modeling, algebraic computation, matrices-based computation, optimizations or iterative computation from the prior art, which can be very computationally-expensive methods. For example, using convolution as a computation method, the whole light dose distribution can be convolved or de-convolved in a single pass with a single "compensation" function, whereas finite element modeling requires to create a very fine mesh of the geometry of the object to be produced and iteratively compute the interactions of each and every point of the mesh with its neighboring points, which is computationally expensive.

In a preferred embodiment, said convolution is performed analytically, or in the Fourier domain, or algebraically, or point-by-point, or with a combination thereof.

Convolution and de-convolution are known methods and do not have to be discussed in detail here.

The flowchart of FIG. 2 provides a non-limiting description of a preferred embodiment for digitally compensating the inhomogeneous reactivity of a photoresponsive material within a build volume of an additive manufacturing system.

As described above, in a first step (10) a digital model of the three-dimensional object to be produced by the method of the present invention is provided.

In said preferred embodiment, said computation of said compensation comprises a convolution or deconvolution of said predicted three-dimensional light dose distribution in the photoresponsive material with a function (20) describing an elementary auto-acceleration or auto-deceleration alteration response of the photoresponsive material to an elementary light dose. As discussed above, said function can be derived theoretically (20) or experimentally (29).

In a very preferred embodiment, said convolution is performed analytically, or in the Fourier domain, or algebraically, or point-by-point, or with a combination thereof.

In a very preferred embodiment, said function describing an elementary auto-acceleration or auto-deceleration alteration response of the photoresponsive material to an elementary light dose comprises one or more scaling coefficients that affect the height, the width, or both the height and the width of said function.

In an alternative embodiment, said function describing an elementary auto-acceleration or auto-deceleration alteration response of the photoresponsive material to an elementary light dose can be obtained experimentally, by irradiating a sample of the photoresponsive material with a respective light dose, and measuring the occurring auto-acceleration and auto-deceleration effects (29). Preferably, said scaling coefficients that affect the height, the width, or both the height and the width of said function are measured experimentally on a sample of said photoresponsive material. Optionally said scaling coefficients are derived using a machine learning process, that is fed with said experimental measurements on said sample of said photoresponsive material (32). Briefly, said machine learning process can be, but is not limited to, a regression analysis model. The input data of said regression analysis model can be a set of experimental measurements of the photoresponsive material's polymerization kinetics and thermal diffusion performed at various illumination intensities on samples of said photoresponsive material (32). Said experimental measurements can be performed for example by using calorimetry or photorheometry. Said regression analysis model can infer said scaling coefficients of said function from said set of experimental measurements and said various illumination intensities.

In a very preferred embodiment, said function describing an elementary auto-acceleration or auto-deceleration alteration response of the photoresponsive material to an elementary light dose comprises an impulse response function, wherein said impulse response function comprises the influence of an effect selected from the group consisting of:

- heat generated within a specific area of said photoresponsive material (32), said heat influencing the reaction rate within said specific area and possibly the surrounding areas;
- viscosity, such as the Trommsdorff-Norrish effect,
- photobleaching,
- scattering,
- or any combination thereof.

Furthermore, in said preferred embodiment, said predicted three-dimensional light dose distribution in the photoresponsive material is obtained by the following steps:

- defining a target alteration distribution in said photoresponsive material from said digital model of said three-dimensional object (21);
- defining an input alteration distribution in said photoresponsive material using said target alteration distribution (22);
- defining said sequence of patterns of light from said input alteration distribution in said photoresponsive material (23); and
- deriving from said sequence of patterns of light said predicted three-dimensional light dose distribution within said photoresponsive material (24).

In the non-limiting case of tomographic additive manufacturing, said step (23) can be computed using a filtered inverse radon transform and said step (24) can be computed using a filtered radon transform.

In said preferred embodiment, said convolution of said predicted three-dimensional light dose distribution by said function provides a predicted three-dimensional alteration distribution (25) within said photoresponsive material, which is used for correcting said input alteration distribution in said photoresponsive material such that the predicted alteration distribution more closely matches said target alteration distribution (26).

In said preferred embodiment, a compensated sequence of patterns of light is derived from said corrected input alteration distribution (27), which is used in step c) of the method of the present invention for creating the three-dimensional object (12, 13, 14).

In said preferred embodiment, said compensation is repeated until a predetermined threshold for a reduction of distortion of alteration between the predicted alteration distribution and the target alteration distribution has been reached (28).

The method of the present invention can be carried out with any photoresponsive material commonly used in additive manufacturing methods, i.e. any photoresponsive material that is capable of alteration of its material phase upon irradiation by light.

In a preferred embodiment of the method of the present invention, said photoresponsive material comprises at least one component selected from a list consisting of:

- a prepolymer,
- a photo-initiator that interacts with said one or more light sources to selectively alter the phase of said photoresponsive material,
- a chain extender;
- a reactive diluent;
- a filler;
- a polymerization inhibitor;
- a pigment or dye;
- solid particles, most preferably metallic powder particles, preferably particles selected from the list consisting of plastic particles, polymeric particles, ceramic particles, glass particles and any combination thereof.

In a preferred embodiment, said photoresponsive material comprises a first photo-initiator in an amount such that an optical depth of penetration of at least one of the said one or more light sources is larger than a fifth of a width of said three-dimensional object.

Examples of photoresponsive materials for volumetric additive manufacturing are described in EP-3 333 629 A1 and in DE 10 2019 129 868. Moreover, examples of photoresponsive materials for layer-wise additive manufacturing are described in US-2017/0151718 A1.

According to the embodiment of the present invention that involves dual-color volumetric additive manufacturing, a photoresponsive material is used that changes its material phase only upon the concurrent irradiation by two different wavelengths of light and does not change its material phase when irradiated by only one of the first or second wavelength of light. Such photoresponsive materials are known, for example from EP-3 691 860 A1. It may be, for example, a liquid photoresponsive material that comprises a first photoinitiator and a second photoinitiator, wherein said first and second photoinitiator interact with light of different wavelengths. Alternatively, the photoresponsive material may comprise a photoinhibitor that interacts with a second wavelength of light to selectively hinder the ability of a first wavelength of light to alter the phase of said photoresponsive material.

According to another alternative embodiment, the photoresponsive material may comprise a two-stage photo-initiator, such that said photoresponsive material is locally altered upon local simultaneous or successive illumination with first and second wavelengths of light but not altered if locally illuminated with only one of the wavelengths of light. Such two-stage photoinitiators are known and described, for example, in Regehly et al., Nature, Vol. 588 (2020), 620-624. An example is a spiropyran as described in Regehly et al., ibid).

Examples of volumetric additive manufacturing systems are tomography-based additive manufacturing and dual-color volumetric additive manufacturing.

Thus, the present invention also provides a system for producing a three-dimensional object from a photoresponsive material (32), the system comprising:

a first projection unit capable of emitting controlled spatial patterns of light;

optionally a second projection unit, which is optionally capable of emitting controlled spatial patterns of light;

a means for computing a sequence of projections describing the three-dimensional object to be formed along different orientation angles, different layers, or different combinations of orientation angles and layers of said object; said projections being used to define said controlled patterns of light, wherein said means is configured to provide a compensation of an expected light intensity of said projections for any deviations of an alteration rate in said photoresponsive material caused by auto-acceleration or auto-deceleration, so as to obtain a constant alteration rate throughout said photoresponsive material, wherein said compensation is computed from a predicted three-dimensional light dose distribution in the photoresponsive material and a function describing an alteration response of the photoresponsive material to light dose.

a vessel, which is optionally optically transparent to said patterns of light, said vessel intended to contain a volume of photoresponsive material, and said vessel and the intended photoresponsive material defining a build volume;

wherein the first projection unit is arranged in the system to irradiate said build volume with said controlled patterns of light; and a direction varying means, or a position varying means, or a means able to vary both position and direction, operatively associated with said first projection unit, for controllably varying a direction or position of incidence of said patterns of light relative to said build volume, either by rotating and/or moving the build volume within the field of illumination of the first projection unit, or by rotating and/or moving the first projection unit relative to the build volume, or a combination of both of these rotations and/or motions, and for executing the computed sequence of projections by irradiating the photoresponsive medium with the controlled patterns of light from directions and positions corresponding to the different orientation angles and positions thereby creating a three-dimensional distribution of alterations of the photoresponsive medium, and creating the three-dimensional object.

In a further embodiment of the system of the present invention, said computation of said compensation comprises a convolution or deconvolution of said predicted three-dimensional light dose distribution in the photoresponsive material with a function describing an elementary auto-acceleration or auto-deceleration alteration response of the photoresponsive material to an elementary light dose.

In a preferred embodiment, said system is a volumetric additive manufacturing system, preferably selected from the group consisting of a tomography-based additive manufacturing system and a dual-color-based additive manufacturing system.

In a preferred embodiment, said spatial patterns of light are two-dimensional.

In another embodiment of the system of the present invention, said spatial patterns of light are one-dimensional.

In a further embodiment, said system is a layer-by-layer additive manufacturing system selected from the group consisting of stereolithography, selective laser sintering, selective laser melting, continuous liquid interface production.

Figure 3:
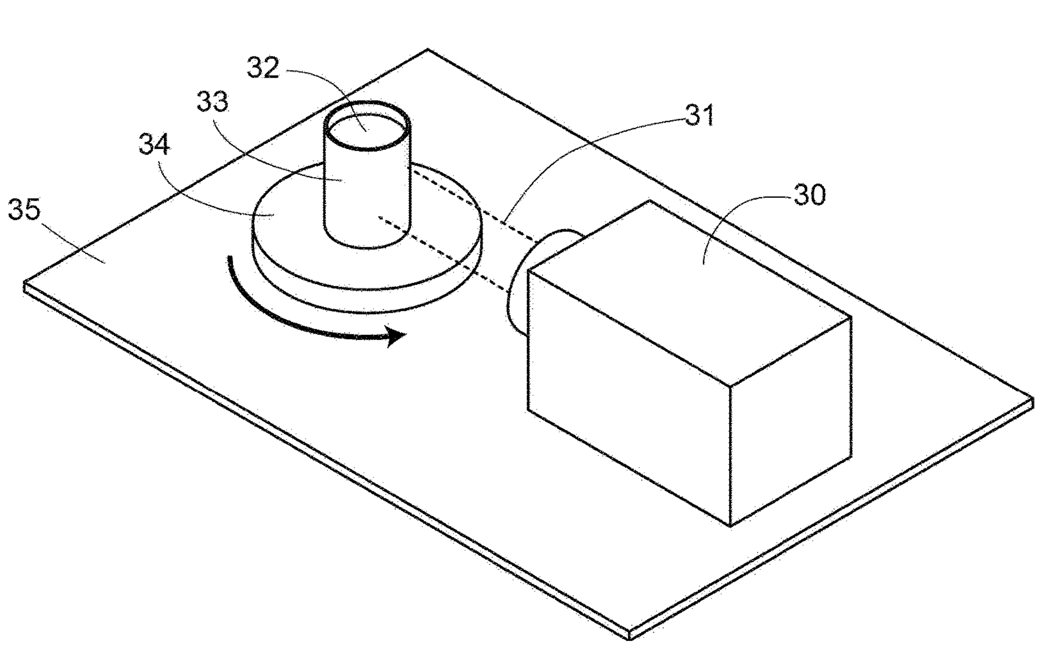
FIG. 3: is a perspective view of one example of a conventional tomography-based additive manufacturing system.

FIG. 3 describes a conventional tomography-based additive manufacturing system. A projection unit 30 generates controllable patterns of light (beam of light) 31, which are directed to a photoresponsive material 32. The photoresponsive material 32 is held inside a vessel (container) 33 that is optically transparent to the wavelength of the light. This vessel 33 is fixed on a rotating platform 34, so that the orientation of the photoresponsive material 32 relative to the beam of light 31 may be controllably varied in one or both rotation directions, either continuously or in incremental steps. As the photoresponsive material 32 is rotated, a pattern (not shown in FIG. 3) generated by the projection unit 30 is varied so that the desired volumes of the photoresponsive material 32 are being illuminated. The various components of this embodiment are mounted on a support structure 35, whose particular design is not critical and can assume a variety of configurations.

In an alternative embodiment (not shown here), the projection unit 30 is moved and/or rotated relative to said build volume, to achieve the above effect. In a further embodiment (not shown here), the projection unit 30 and the build volume are both moved and/or rotated relative to one another.

The vessel (container) 33 and the photoresponsive medium 32 together form the build volume. The vessel 33 may for example be a cylindrical vial made of glass or plastic or any light-transparent material. The build region may for example be 1 cm wide to 15 cm wide and 1 cm high to 15 cm high.

The optical absorption length at the wavelength of the photo-altering radiation in the photoresponsive material 32 may for example be tuned to be longer than the build volume width.

The projection unit 30 is a device that may generate spatial patterns of light. The projection unit 30 may for example include a directly modulable light source such as an LED array, or it may include a light source with a fixed spatial profile (such as a laser or an LED) combined with a spatial a light modulator. The spatial light modulator may consist of galvanometer-scanners, a liquid crystal spatial light modulator, or preferably of a digital micromirror device (DMD). The generated patterns of light may be zero-dimensional (spots), one-dimensional (lines), two-dimensional (images), or three-dimensional (holograms). One skilled in the art will understand that the projection unit 30 may incorporate additional optical elements, for example a cylindrical lens to correct for the distortion caused by a cylindrical container, or relay lenses to accurately project the light patterns inside the build volume.

The projection unit 30 is controlled by a means 45 for computing a sequence of projections describing the three-dimensional object to be formed. Said means 45 is shown schematically in FIG. 3 and may be any processing unit such as a computer that is capable of performing the computing of said sequence of projections as well as computing the compensation described above.

In tomography-based additive manufacturing systems, the whole three-dimensional object is formed at once. Such systems are therefore highly sensitive to reactivity inhomogeneities of the photoresponsive material and compensating the sequence of light patterns for auto-acceleration or auto-deceleration alteration response to light is highly advantageous over prior art.

Figure 4:
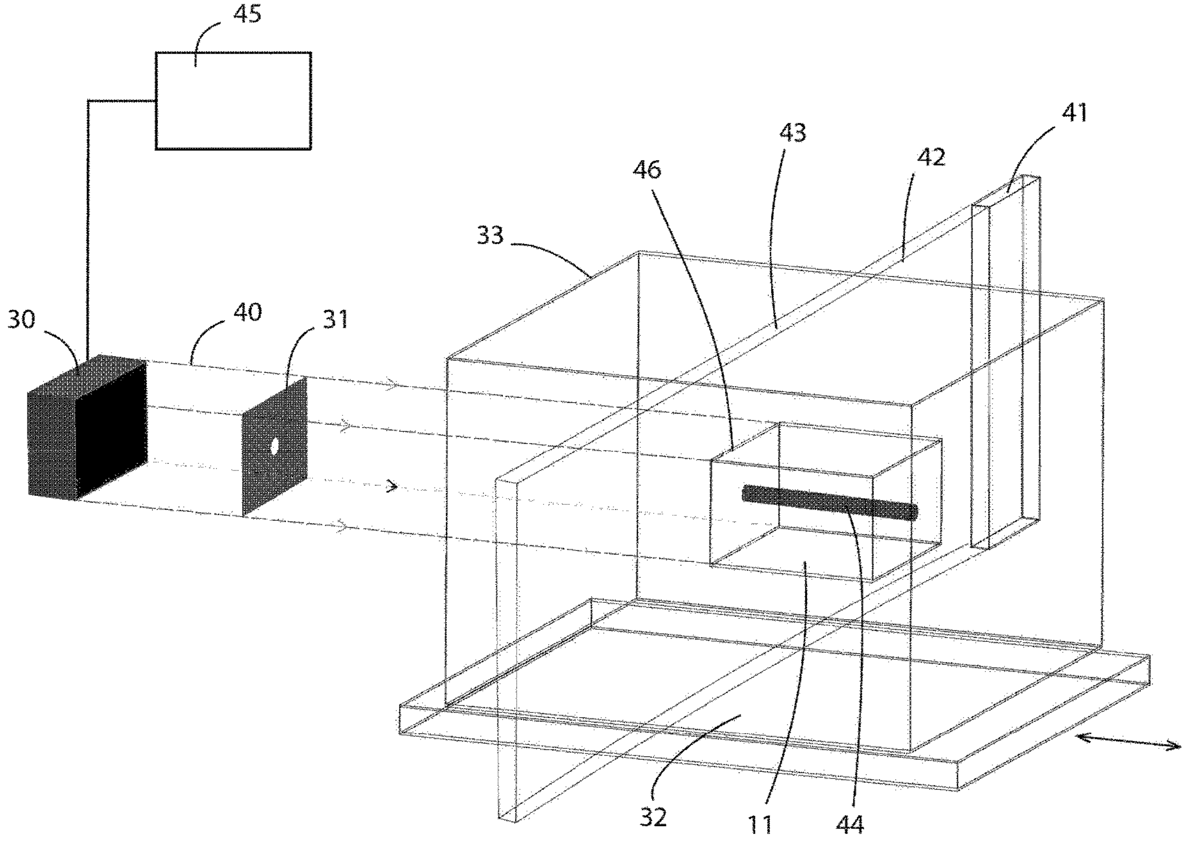
FIG. 4: is a perspective view of one example of a conventional xolography additive manufacturing system.

FIG. 4 describes a conventional dual-color volumetric additive manufacturing system. A first projection unit 30 emitting light at a first wavelength 40 is arranged to irradiate with spatial patterns of light 31 the photoresponsive material 32 contained within the optically transparent vessel 33. A second projection unit 41 emitting light (spatial patterns of light) at a second wavelength 42 is arranged to irradiate the photoresponsive material 32 with a light sheet 43 whose propagation direction is orthogonal to the propagation direction of the spatial patterns of light 31. A sequence of projections describing the structure 44 to be fabricated is computed by the means 45 and used to define the sequence of spatial light patterns 31. The photoresponsive material 32 is sequentially irradiated with the sequence of spatial light patterns 31, according to the defined sequence. For each light pattern of the sequence 31, the second projection unit 41 irradiates a defined layer 46 of the photoresponsive material 32. The concurrent irradiation of the photoresponsive material 32 by the two light beams of the first and second projection unit 30, 41 cures the layer 46. The optically transparent vessel 33 is then moved orthogonally to the light sheet 43 propagation direction, as indicated by the arrow in FIG. 4. The projection, curing and displacement steps are repeated according to the defined sequence 31 until the structure is fabricated.

In dual-color volumetric additive manufacturing, such as xolography, the three-dimensional object is formed rapidly and the whole build volume is illuminated by one or more projection units. Dual-color volumetric additive manufacturing is thus also highly sensitive to reactivity inhomogeneities of the photoresponsive material, and it requires compensation of the sequence of the light patterns to achieve a higher precision and accuracy of the formed object.

In another embodiment of the present invention, the vessel used in either single-color or dual-color volumetric additive manufacturing systems comprises one or more inlets and one or more outlets to facilitate post-processing of the volumetrically produced three-dimensional objects and thus improve automation of the volumetric additive manufacturing systems. In a preferred embodiment, said vessel comprises at least an inlet and an outlet and most preferably at least two inlets and two outlets, said inlets and outlets being used for any post-processing steps from the group consisting of:

developing said produced three-dimensional object,
curing said produced three-dimensional object,
perfusing said produced three-dimensional object.

Figure 5:
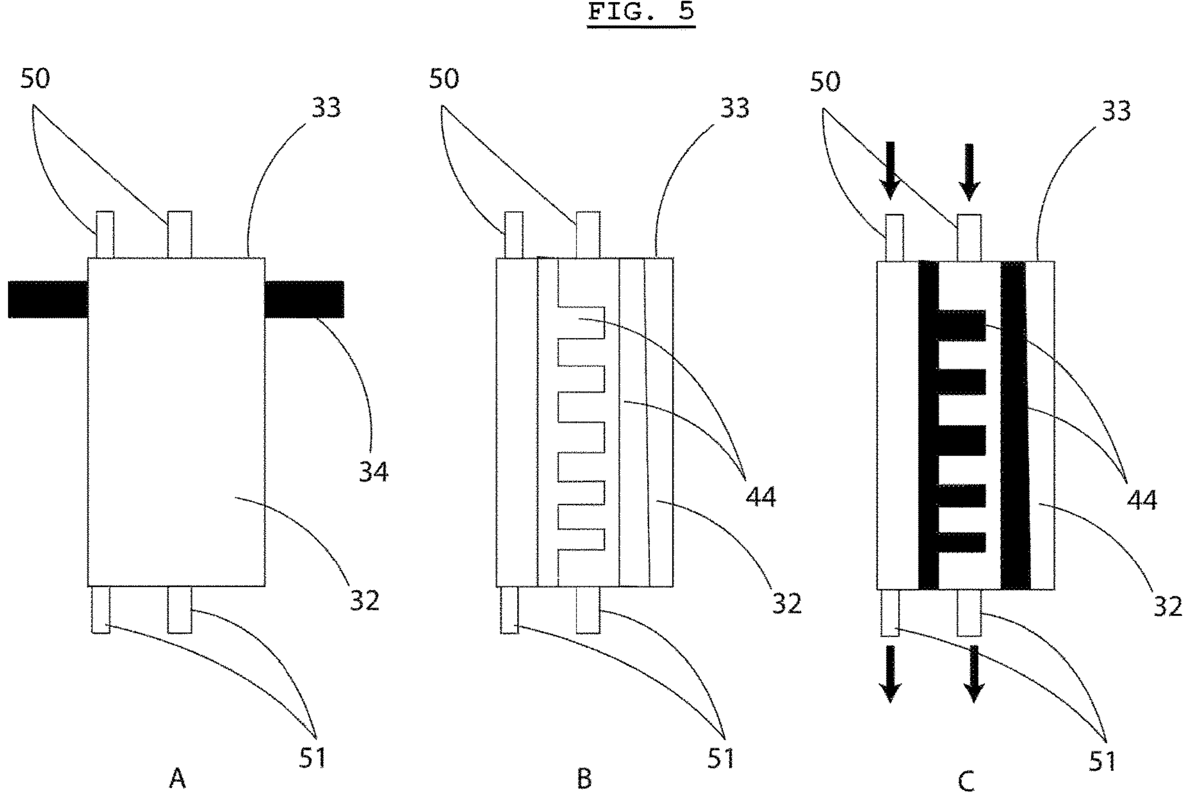
FIG. 5: is a side view of one example of vessel with inlets and outlets used for volumetric additive manufacturing.

FIG. 5 describes an example of a vessel using in a volumetric additive manufacturing system that has two inlets and two outlets. FIG. 5*a* shows a side view of a vessel 33 comprising two inlets 50 and two outlets 51, filled with a cell-laden photoresponsive material 32, and placed in a direction-varying means or a position-varying means 34 of a volumetric additive manufacturing system. FIG. 5*b* shows the vessel 33 with a volumetrically fabricated three-dimensional cell-laden object 44. FIG. 5*c* shows that the polarized cell-laden object 44 is developed insitu the vessel 33 using the two inlets 50 and two outlets 51 to wash the uncrosslinked photoresponsive material 32 and then perfuse the developed object 44 using the two inlets 50 and two outlets 51.

For instance, said vessel could be used to mass-produce three-dimensional hepatic living structures, that after volumetric fabrication would be developed in the vessel and then perfused with nutrients to grow and mature them, and then used for toxicity or efficiency assays of candidate drugs.

Optionally said vessel additionally comprises at least one flat surface to perform imaging of the produced said three-dimensional object.

In another embodiment of the present invention, said vessel can be used as an insert in a micro- or macro-well plate.

Compensating light patterns for reactivity inhomogeneities is also highly advantageous in conventional additive manufacturing systems.

In stereolithography, a three-dimensional object is formed by sequentially solidifying thin slices of a highly-absorbing photoresponsive material using a sequence of light patterns, thereby creating the object. In an alternative embodiment of the present invention, a stereolithography system comprises a means for computing a sequence of projections describing the three-dimensional object to be formed along different layers; said projections being used to define said sequence of light patterns, wherein said means is configured to provide a compensation of an expected light intensity of said projections for any deviations of an alteration rate in said photoresponsive material caused by auto-acceleration or auto-deceleration, so as to obtain a constant alteration rate throughout said photoresponsive material, wherein said compensation is computed from a predicted three-dimensional light dose distribution in the photoresponsive material and a function describing an alteration response of the photoresponsive material to light dose.

In selective laser melting (SLM) or selective laser sintering (SLS), successive thin layers of a metal powder or respectively plastic, ceramic or glass powder filling a build volume are selectively molten and fused using a high-power laser beam, thereby forming an object according to a digital model initially provided. The process of melting and fusing an area of the powder build volume is highly dependent on the heat generated by the melting and fusing of previous locations of the build volume since the required energy to melt the powder depends on the temperature of the powder. A location with a high temperature will fuse faster under light irradiation than a location with a low temperature. Hence, locations are often fused unwillingly because of the high heat generated during the fusing of previous layers or locations.

Therefore, in another embodiment of the present invention, a selective laser melting system comprises a means for computing a sequence of projections describing the three-dimensional object to be formed along different layers; said projections being used to define said sequence of light patterns, wherein said means is configured to provide a compensation of an expected light intensity of said projections for any deviations of an alteration rate in said metal powder caused by auto-acceleration or auto-deceleration, so as to obtain a constant alteration rate throughout said metal powder, wherein said compensation is computed from a predicted three-dimensional light dose distribution in the metal powder and a function describing an alteration response of the metal powder to light dose.

Similarly in another embodiment of the present invention, a selective laser sintering system comprises a means for computing a sequence of projections describing the three-dimensional object to be formed along different layers; said projections being used to define said sequence of light patterns, wherein said means is configured to provide a compensation of an expected light intensity of said projections for any deviations of an alteration rate in said powder caused by auto-acceleration or auto-deceleration, so as to obtain a constant alteration rate throughout said powder, wherein said compensation is computed from a predicted three-dimensional light dose distribution in the powder and a function describing an alteration response of the powder to light dose.

In another embodiment, the present invention provides a method for producing a three-dimensional object, the method comprising:

a) providing a digital model of said three-dimensional object,
b) defining a sequence of patterns of light from said digital model, and
c) irradiating with each of said patterns of light according to the defined sequence a photoresponsive material that is capable of alteration of its material phase upon irradiation by light, thereby creating a three-dimensional distribution of alterations within the photoresponsive material which physically reproduces said three-dimensional object, thereby creating the three-dimensional object, characterized in that the step of defining said sequence of patterns of light involves a compensation of an expected light intensity of said patterns of light for any deviations of said three-dimensional object geometry from said digital model geometry of said three-dimensional object, wherein said compensation is computed using machine learning.

Said machine learning process can be, but is not limited to, a regression analysis model that aims at estimating from the produced three-dimensional objects the causes for systematic geometric deviations from the respective digital models of said three-dimensional objects. In more detail, the input, also called independent variables, of said regression analysis model can be a set of measured least squares geometric deviations between a set of produced three-dimensional objects and their respective digital models. The measurement of the geometric dimensions of the produced three-dimensional objects can be performed for example with a 3D scanner. The dependent variables of said regression analysis model can be the set of sequences of light patterns that were used to produce said set of respective three-dimensional objects. The regression analysis model can be programmed to infer the causal relationships between said set of inputs deviations and said respective sequences of light patterns, thus allowing to compute said compensation of expected light intensity of said patterns of light for producing said three-dimensional object in the above embodiment.

According to the above embodiment, said compensation can be achieved by predicting a deviation of the produced three-dimensional geometry of the object from the targeted digital file of said three-dimensional object, and computing therefrom, with the aid of machine learning, the required compensation of said patterns of light. Accordingly, the inputs of the machine learning processes can be a set of digital models of three-dimensional objects and a three-dimensional scan of the respective volumetrically produced three-dimensional objects. In this way, a machine learning process could identify patterns of deviations from digital models to volumetrically printed objects and thus pre-compensate the sequence of patterns of light.

The inputs of the machine learning process can also be, but not limited to, real-time images or recordings of the volumetric fabrication process of a set of three-dimensional objects.

The invention claimed is:

1. A method for producing a three-dimensional object, the method comprising:

a) providing a digital model of said three-dimensional object,
b) defining a sequence of patterns of light from said digital model, and
c) irradiating with each of said patterns of light according to the defined sequence a photoresponsive material that is capable of alteration of its material phase upon irradiation by light, thereby creating a three-dimensional distribution of alterations within the photoresponsive material which physically reproduces said three-dimensional object, thereby creating the three-dimensional object, wherein the step of defining said sequence of patterns of light involves a compensation of an expected light intensity of said patterns of light for any deviations of an alteration rate in said photoresponsive material caused by auto-acceleration or auto-deceleration, so as to obtain a constant alteration rate throughout said photoresponsive material, wherein said compensation is computed from a predicted three-dimensional light dose distribution in the photoresponsive material and a function describing an alteration response of the photoresponsive material to light dose, wherein said computation of said compensation comprises a convolution or deconvolution of said predicted three-dimensional light dose distribution in the photoresponsive material with a function describing an elementary auto-acceleration or auto-deceleration alteration response of the photoresponsive material to an elementary light dose.

2. The method according to claim 1, wherein said function describing an elementary auto-acceleration or auto-deceleration alteration response of the photoresponsive material to an elementary light dose comprises an impulse response function, wherein said impulse response function comprises the influence of an effect selected from the group consisting of:

heat generated within a specific area of said photoresponsive material, said heat influencing the reaction rate within said specific area;

viscosity, photobleaching, scattering, and any combination thereof.

3. The method according to claim 1, wherein said predicted three-dimensional light dose distribution in the photoresponsive material is obtained by the following steps:

defining a target alteration distribution in said photoresponsive material from said digital model of said three-dimensional object;

defining an input alteration distribution in said photoresponsive material using said target alteration distribution;

defining said sequence of patterns of light from said input alteration distribution in said photoresponsive material; and deriving from said sequence of patterns of light said predicted three-dimensional light dose distribution within said photoresponsive material.

4. The method according to claim 1, wherein said convolution of said predicted three-dimensional light dose distribution by said function provides a predicted three-dimensional alteration distribution within said photoresponsive material, which is used for correcting said input alteration distribution in said photoresponsive material until a predetermined threshold for a reduction of distortion of alteration between the predicted alteration distribution and the target alteration distribution has been reached such that the predicted alteration distribution more closely matches said target alteration distribution.

5. The method according to claim 4, wherein from said corrected input alteration distribution a compensated sequence of patterns of light is derived, which is used in step c) for creating the three-dimensional object.

6. The method according to claim 1, wherein said compensation is repeated until a predetermined threshold for a reduction of distortion of alteration between the predicted alteration distribution and the target alteration distribution has been reached.

7. The method according to claim 1, wherein said convolution is performed analytically, or in the Fourier domain, or algebraically, or point-by-point, or with a combination thereof.

8. The method according to claim 1, wherein said function describing an elementary auto-acceleration or auto-deceleration alteration response of the photoresponsive material to an elementary light dose comprises one or more scaling coefficients that affect the height, the width, or both the height and the width of said function.

9. The method according to claim 8, wherein said scaling coefficients are measured experimentally on a sample of said photoresponsive material.

10. The method according to claim 1, wherein said sequence of patterns of light is provided by computing a sequence of back-projections describing the three-dimensional object to be formed from different orientation angles of said object, or alternatively from different layers of said object.

11. The method according to claim 9 wherein said scaling coefficients are derived using a machine learning process that is fed with said experimental measurements on said sample of said photoresponsive material.

12. A system for producing a three-dimensional object from a photoresponsive material, the system comprising:

a first projection unit capable of emitting controlled spatial patterns of light;

a means for computing a sequence of projections describing the three-dimensional object to be formed along different orientation angles, different layers, or different combinations of orientation angles and layers of said object;

said projections being used to define said controlled patterns of light, wherein said means is configured to provide a compensation of an expected light intensity of said projections for any deviations of an alteration rate in said photoresponsive material caused by auto-acceleration or auto-deceleration, so as to obtain a constant alteration rate throughout said photoresponsive material, wherein said compensation is computed from a predicted three-dimensional light dose distribution in the photoresponsive material and a function describing an alteration response of the photoresponsive material to light dose, wherein said computation of said compensation comprises a convolution or deconvolution of said predicted three-dimensional light dose distribution in the photoresponsive material with a function describing an elementary auto-acceleration or auto-deceleration alteration response of the photoresponsive material to an elementary light dose;

a vessel, said vessel intended to contain a volume of photoresponsive material, and said vessel and the intended photoresponsive material defining a build volume;

wherein the first projection unit is arranged in the system to irradiate said build volume with said controlled patterns of light; and a direction varying means, or a position varying means, or a means able to vary both position and direction, operatively associated with said first projection unit, for controllably varying a direction or position of incidence of said patterns of light relative to said build volume, either by rotating and/or moving the build volume within the field of illumination of the first projection unit, or by rotating and/or moving the first projection unit relative to the build volume, or a combination of both of these rotations and/or motions, and for executing the computed sequence of projections by irradiating the photoresponsive material with the controlled patterns of light from directions and positions corresponding to the different orientation angles and positions thereby creating a three-dimensional distribution of alterations of the photoresponsive material, and creating the three-dimensional object.

13. The system according to claim 12, wherein said system is a volumetric additive manufacturing system.

14. The system according to claim 12, wherein said vessel comprises at least an inlet and an outlet, said inlet and outlet being used for any post-processing steps from the group consisting of:

developing said produced three-dimensional object, curing said produced three-dimensional object, and perfusing said produced three-dimensional object.

15. The system according to claim 12 comprising a second projection unit which is capable of emitting controlled spatial patterns of light.

16. The system according to claim 12 wherein the vessel is optically transparent to said patterns of light.

17. The system according to claim 13 wherein the volumetric additive manufacturing system is selected from the group consisting of a tomography-based additive manufacturing system and a dual color-based additive manufacturing system.

18. The system according to claim 14 wherein the system comprises at least two inlets and at least two outlets.

* * * * *